United States Patent
Handa

(10) Patent No.: US 7,548,827 B2
(45) Date of Patent: Jun. 16, 2009

(54) MAGNETIC DATA PROCESSING APPARATUS, METHOD AND MACHINE READABLE MEDIUM

(75) Inventor: Ibuki Handa, Iwata (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 12/143,480

(22) Filed: Jun. 20, 2008

(65) Prior Publication Data

US 2008/0316629 A1   Dec. 25, 2008

(30) Foreign Application Priority Data

Jun. 25, 2007  (JP) ............... 2007-166734

(51) Int. Cl.
*G11B 20/20* (2006.01)
*G06F 11/00* (2006.01)

(52) U.S. Cl. ................... 702/115
(58) Field of Classification Search ........... 702/115
See application file for complete search history.

(56) References Cited

U.S. PATENT DOCUMENTS 7,418,359 B2 * 8/2008 Handa .................. 702/104

| | | | |
|---|---|---|---|
| 2004/0189285 A1 * | 9/2004 | Uenoyama | 324/207.12 |
| 2006/0031014 A1 * | 2/2006 | Sato et al. | 701/224 |
| 2007/0124096 A1 * | 5/2007 | Yasui et al. | 702/104 |
| 2007/0136020 A1 * | 6/2007 | Yasui et al. | 702/104 |
| 2007/0213950 A1 * | 9/2007 | Handa | 702/95 |

FOREIGN PATENT DOCUMENTS

JP   2006-053081   2/2006

* cited by examiner

*Primary Examiner*—Michael P. Nghiem
*Assistant Examiner*—Cindy H Khuu
(74) *Attorney, Agent, or Firm*—Dickstein Shapiro LLP

(57) ABSTRACT

A magnetic data processing apparatus having a first generation part that stores samples of the magnetic data in accordance with a first sampling rule, and generates first offset update data based on the stored samples of the magnetic data when a distribution of the stored samples of the magnetic data indicates a first feature. A second generation part stores samples of the magnetic data in accordance with a second sampling rule, and generates second offset update data based on the stored samples of the magnetic data when a distribution of the stored samples of the magnetic data indicates a second feature. An update part updates an offset value of the magnetic data based on the first offset update data when the same is generated, and updates the offset value of the magnetic data based on the second offset update data when the same is generated.

10 Claims, 5 Drawing Sheets

MAGNETIC DATA PROCESSING APPARATUS, METHOD AND MACHINE READABLE MEDIUM

BACKGROUND OF THE INVENTION

1. Technical Field

The present invention relates to a magnetic data processing apparatus, a magnetic data processing method and a machine readable medium containing a magnetic data processing program. More particularly, the present invention relates to a technology for updating an offset value of magnetic data outputted from a magnetic sensor.

2. Related Art

Heretofore, a method for updating an offset value of magnetic data is disclosed for example in Patent Document 1, Japanese Laid-Open Patent Application publication Patent No. 2006-53081. A track of magnetic data outputted by the magnetic sensor indicates a specific feature that varies depending on a carrier which carries an apparatus containing the magnetic sensor. Therefore, an optimum method of generating offset update data for updating the offset value varies in accordance with a manner by which the apparatus mounting thereon the magnetic sensor is carried (e.g., see Patent Document 1). One of the examples will be provided below. Namely, in a case where an apparatus on which a three-dimensional magnetic sensor is mounted is manually held by a person, a posture of the apparatus changes fast as compared with a case where the apparatus is held in a car. The posture of the magnetic sensor changes freely in a three-dimensional space when the magnetic sensor is carried by a person. Therefore, a large change in the magnetic data outputted by the three-dimensional magnetic sensor disposed on the manually held apparatus likely occurs even in a relatively short period. On the other hand, when the three-dimensional magnetic sensor is mounted on the car, the car substantially moves along a horizontal plane, and the posture of the car slowly changes during turning as compared with the posture change of the apparatus containing the magnetic sensor manually held by the person. Therefore, a large change in the magnetic data outputted by the three-dimensional magnetic sensor mounted on the apparatus held by the car does not likely occur in a relatively short period. When a distribution of the magnetic data for use in generating the offset update data is wide, the offset value is usually accurately updated. Therefore, the method of generating the offset value needs to be changed depending on types of carriers which carry the apparatus containing the three-dimensional magnetic sensor.

In the Patent Document 1, there is disclosed a method of monitoring a state of physical connection between an azimuth measuring apparatus and another vehicle-mounted apparatus. It is judged whether the azimuth measuring apparatus incorporating therein a magnetic sensor is being carried by a pedestrian of a vehicle or attached to a vehicle, or being carried by a person, to switch a computation mode of an offset value based on a result of the judgment.

However, the method disclosed in Patent Document 1 has a problem that hardware for monitoring the state of connection between the azimuth measuring apparatus and the vehicle-mounted apparatus is necessary. Moreover, even if a user is allowed to select the computation mode as disclosed in Patent Document 1, there is a problem that the usability of the apparatus is deteriorated.

SUMMARY OF THE INVENTION

The present invention has been contrived to solve the above-described problems, and an object thereof is to provide a magnetic data processing apparatus, a magnetic data processing method and a machine readable medium containing a magnetic data processing program, capable of updating an offset value of a magnetic sensor with good usability to simplify a hardware constitution.

(1) An inventive apparatus is designed for processing magnetic data to update an offset value of the magnetic data. The apparatus comprises: an input part that successively inputs magnetic data from a magnetic sensor; a first generation part that stores samples of the magnetic data in accordance with a first sampling rule, and generates first offset update data based on the stored samples of the magnetic data when a distribution of the stored samples of the magnetic data indicates a first feature; a second generation part that stores samples of the magnetic data in accordance with a second sampling rule, and generates second offset update data based on the stored samples of the magnetic data when a distribution of the stored samples of the magnetic data indicates a second feature; and an update part that updates an offset value of the magnetic data based on the first offset update data when the same is generated, and that updates the offset value of the magnetic data based on the second offset update data when the same is generated.

The magnetic data processing apparatus according to the present invention is provided with two or more generation parts which generate the offset update data for updating the offset value, and the respective generation part stores the magnetic data in the form of samples of the magnetic data according to the sampling rules which are different from each other. Therefore, even in a case where the magnetic data as a sampling target is the same, the track (distribution) of the samples of the magnetic data recorded by the first generation part has a feature which is different from the track of the samples of the magnetic data recorded by the second generation part. Then, the respective generation parts generate the offset update data based on the track of the sampled magnetic data, when the tracks of the magnetic data sampled by the respective part indicate predetermined features, so that an operation mode of the first generation part for generating the offset update data is different from an operation mode of the second generation part. While two or more usage states of the magnetic sensor are assumed, different sampling rules appropriate for each of the usage states are set for the respective generation part. In this case, when the assumed usage state occurs, the offset update data is generated by the generation part corresponding to the usage state. Therefore, in a case where the offset update data is generated in this manner, it can be recognized that the magnetic sensor is used in a state where the offset value is to be updated according to the generated offset update data. Therefore, according to the magnetic data processing apparatus of the present invention, the offset value can be updated by the offset update data appropriately generated in accordance with the usage state without judging the usage state of the magnetic sensor. For the above-mentioned reason, in the present invention, it is possible to realize the magnetic data processing apparatus, which is capable of updating the offset value of the magnetic sensor with good usability, thereby simplifying a hardware constitution.

(2) In the magnetic data processing apparatus for achieving the above object, the first generation part adopts a first sampling rule that represents a sampling interval during which a number of samples are stored for generating the first offset update data, and that represents a sampling period at which each sample is stored, and the second generation part adopts a second sampling rule that represents a sampling interval longer than the sampling interval of the first sampling rule, and that represents a sampling period longer than the sampling period of the first sampling rule.

The sampling interval is a time span from a start time when a first sample of magnetic data for use in generating one offset update data is outputted by the magnetic sensor to an end time when a last sample of the magnetic data for use in generating the offset update data is outputted by the magnetic sensor. On the other hand, the sampling period determines a sampling cycle at which each sample is stored. When the sampling interval of the magnetic data is long and the sampling period is larger, the magnetic data corresponding to a slow posture change of the magnetic sensor can efficiently be stored in a broad range. On the other hand, when the sampling period of the magnetic data is large, the magnetic data corresponding to a fast posture change of the magnetic sensor cannot be well recorded. Therefore, for example, provided that thresholds of the distributions of the magnetic data as conditions on which the first and second generation parts generate the offset value are identical, when the distribution of the magnetic data reaches the specific threshold while the magnetic sensor changes a posture thereof relatively fast, the first generation part generates the offset update data. When the distribution of the magnetic data reaches the threshold while the magnetic sensor relatively slowly changes the posture thereof, the second generation part generates the offset update data. That is, the first generation part is configured for generating the appropriate offset update data, when the magnetic sensor relatively quickly changes the posture, and the second generation part is configured for generating the appropriate offset update data, when the magnetic sensor relatively slowly changes the posture. Then, according to the magnetic data processing apparatus of the present invention, when the first generation part generates the first offset update data, the offset value is updated based on the first offset update data. When the second generation part generates the second offset update data, the offset value is updated based on the second offset update data. Therefore, even if the magnetic sensor slowly changes the posture or quickly changes the posture, the offset value is appropriately updated.

(3) The magnetic data processing apparatus for achieving the above object may comprise the magnetic sensor.

(4) The magnetic data processing apparatus for achieving the object may further comprise a correction part that corrects the magnetic data outputted by the magnetic sensor based on the offset value. For example, the magnetic sensor senses a geomagnetism to output the magnetic data which contains an offset due to an external magnetic field, and the correction part corrects the magnetic data outputted by the magnetic sensor based on the offset value to thereby remove the offset.

The above-mentioned invention is also established and implemented as a method and a program.

(5) That is, the inventive method is designed for processing magnetic data to update an offset value of the magnetic data. The method comprises: successively inputting magnetic data from a magnetic sensor; storing samples of the magnetic data in accordance with a first sampling rule, and generating first offset update data based on the stored samples of the magnetic data when a distribution of the stored samples of the magnetic data indicates a first feature; storing samples of the magnetic data in accordance with a second sampling rule, and generating second offset update data based on the stored samples of the magnetic data when a distribution of the stored samples of the magnetic data indicates a second feature; and updating an offset value of the magnetic data based on the first offset update data when the same is generated, and updating the offset value of the magnetic data based on the second offset update data when the same is generated.

(6) An inventive machine readable medium is provided for use in a computer, the medium containing program instructions executable by the computer to perform processing of magnetic data to update an offset value thereof. The processing comprises: successively inputting magnetic data from a magnetic sensor; storing samples of the magnetic data in accordance with a first sampling rule, and generating first offset update data based on the stored samples of the magnetic data when a distribution of the stored samples of the magnetic data indicates a first feature; storing samples of the magnetic data in accordance with a second sampling rule, and generating second offset update data based on the stored samples of the magnetic data when a distribution of the stored samples of the magnetic data indicates a second feature; and updating an offset value of the magnetic data based on the first offset update data when the same is generated, and updating the offset value of the magnetic data based on the second offset update data when the same is generated.

It is to be noted that an order of operations or processes described in the above is not limited to the described order as long as there is not any technical disturbance factor, and the operations may be executed simultaneously or in an order reverse to the described order, or the operations may not be executed in a continuous order. Moreover, functions of the parts described above are realized by a hardware resource in which the function is specified by a constitution itself, a hardware resource in which the function is specified by a program, or a combination thereof. These functions of the various parts are not limited to functions realized by the hardware resources which are physically independent of each other. Needless to say, the machine readable recording medium of the computer program may be a magnetic recording medium, a magnetic optical recording medium, or any recording medium that will be newly developed in the future.

DETAILED DESCRIPTION OF THE INVENTION

Figure 1:
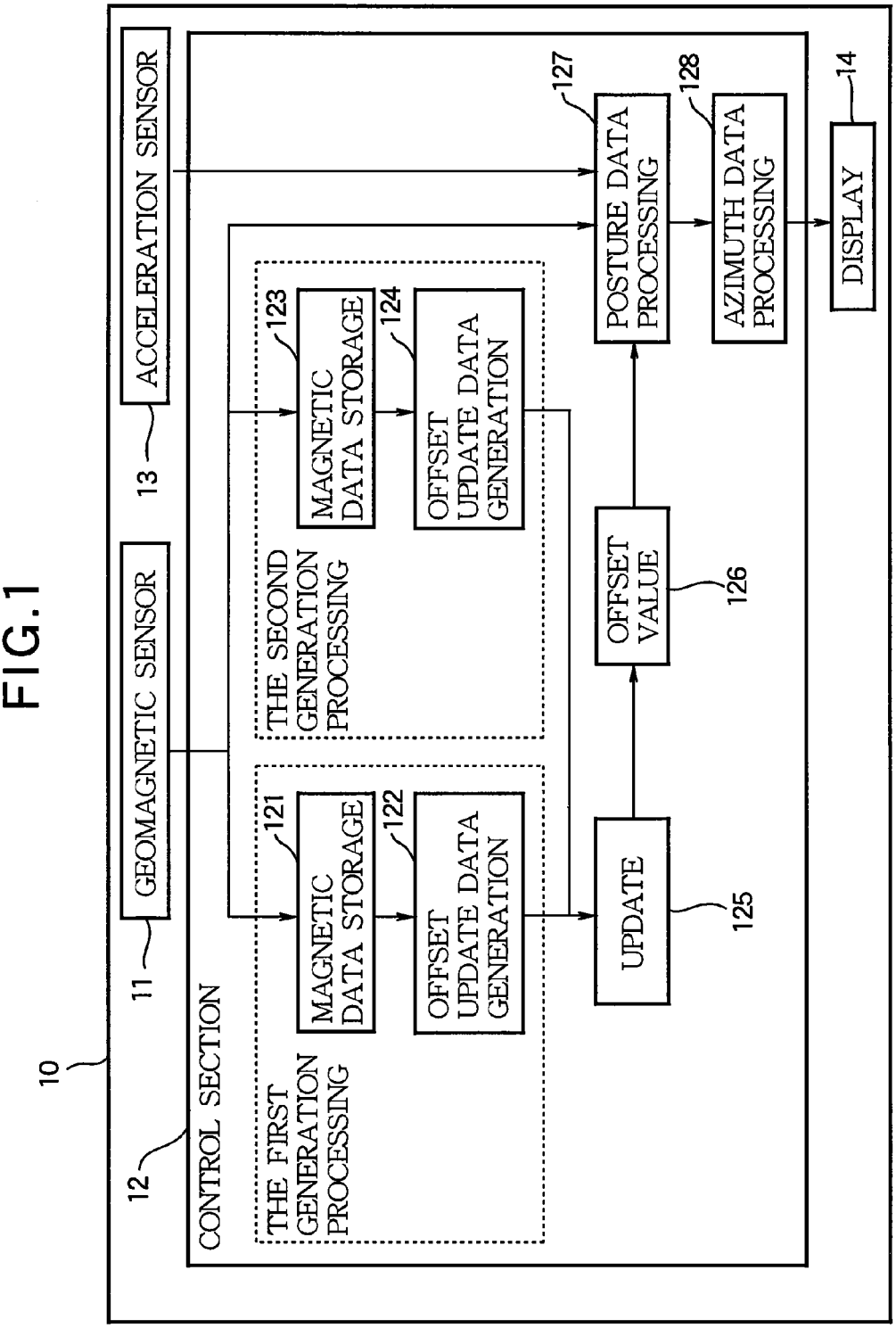
FIG. 1 is a block diagram showing a magnetic data processing apparatus according to an embodiment of the present invention.

Embodiments of the present invention will hereinafter be described with reference to the accompanying drawings in the following order. It is to be noted that corresponding constituting elements in the drawings are denoted with the same reference numerals, and redundant description is, therefore, omitted.

1. Hardware constitution of magnetic data processing apparatus
2. Software constitution of magnetic data processing apparatus
3. Update processing of offset value
4. Another embodiment

[1. Hardware Constitution of Magnetic Data Processing Apparatus]

FIG. 1 is a block diagram illustrating one embodiment of a magnetic data processing apparatus according to the present invention. In FIG. 1, the magnetic data processing apparatus is shown as a control section 12 of a portable or mobile information apparatus 10. The mobile information apparatus 10 includes a geomagnetic sensor 11, an acceleration sensor 13, the control section 12 and a display 14. The mobile information apparatus 10 is a portable information processing apparatus which processes magnetic data, for example, a personal digital assistance (PDA), a portable phone, a portable navigation apparatus, a passometer, an electronic compass or the like.

The geomagnetic sensor 11 includes a plurality of magnetic sensor units constituted of an MI element, an MR element and the like, and outputs magnetic data which is vector data indicating a direction and an intensity of magnetism with three axial components x, y and z crossing one another at right angles. Azimuth data is generated using acceleration data and magnetic data, whereby an azimuth viewed from the portable information apparatus 10 can exactly be displayed.

The acceleration sensor 13 may be of any detection system such as a piezo resistance type, an electrostatic capacity type or a thermal detection type, and outputs the acceleration data as vector data indicating an acceleration in which an acceleration having a direction reverse to that of a gravitational acceleration and an acceleration inherent in movement of the acceleration sensor are combined, by the use of three axial components x, y and z crossing one another at right angles. In a stationary state, a direction of the acceleration data output from the acceleration sensor 13 is a gravitational direction, so that the acceleration data can be used as data indicating tilt of the mobile information apparatus 10.

The control section 12 is a computer including a processor (not shown), a storage medium (e.g., an RAM and an ROM) and an interface, and executes a magnetic data processing program described later to function as input part, first generation part, second generation part, update part and correction part.

Figure 5:
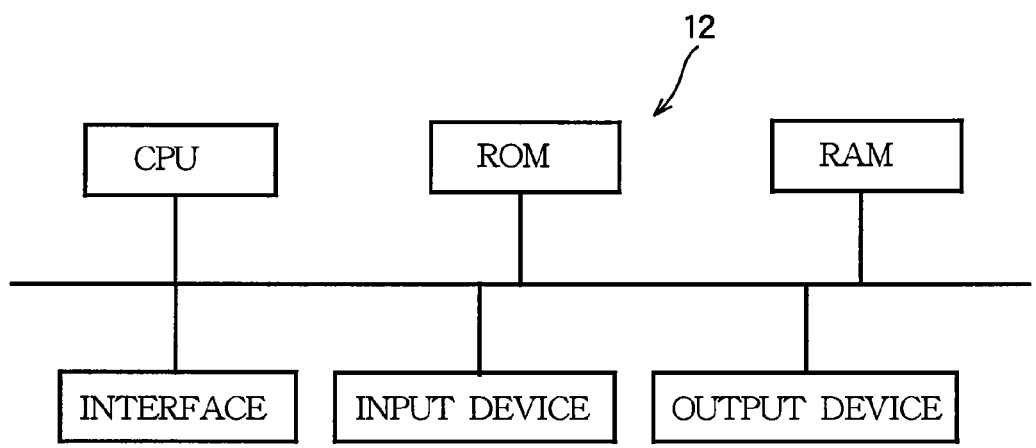
FIG. 5 is a block diagram showing a hardware construction of a control section of the magnetic data processing apparatus according to the embodiment of the present invention.

FIG. 5 is a block diagram showing a hardware construction of the control section 12. As shown in the figure, the control section 12 is basically a computer composed of CPU, ROM, RAM, an interface, an input device and an output device. These components are connected altogether through a bus. The CPU executes the magnetic data processing program. The ROM is a machine readable medium storing the program and data. The RAM is used as a work area of the CPU for executing the program. The interface is provided for connecting the control section 12 to the sensors 11 and 13. The input device is provided to input data and information necessary for executing the program. The output device is provided for outputting the results of executing of the program.

The display 14 includes a flat display panel formed integral with a housing of the portable information apparatus 10.

[2. Software Constitution of Magnetic Data Processing Apparatus]

The control section 12 executes the magnetic data processing program including a module group shown in FIG. 1, to display, in the display 14, the azimuth viewed from the portable information apparatus 10.

Magnetic data storage modules 121, 123 successively input the magnetic data from the geomagnetic sensor 11 into the control section 12, and sample the input magnetic data at predetermined intervals different from each other, to store the data in a buffer. Processing of the magnetic data storage module 121 is the same as that of the magnetic data storage module 123 except that sampling periods and sampling numbers as sampling rules are individually set.

An offset update data generation module 122 generates first offset update data in a case where the mobile information apparatus 10 is manually held by a person. Specifically, the offset update data generation module 122 judges whether or not a distribution indicated by the samples of magnetic data stored in the buffer of the magnetic data storage module 121 is sufficiently broad, and the module 122 generates the first offset update data based on the magnetic data stored in the buffer of the magnetic data storage module 121 only in a case where the distribution is sufficiently broad. This is because the correct offset update data cannot be generated by the magnetic data having a narrow distribution. A criteria value for the judgment may be set to any parameter. For example, the criteria value is set with respect to a ratio of eigenvalues of the distribution of the magnetic data as described in, for example, Japanese Patent Application No. 2007-016320 and the like. The offset update data may be of any type as long as the data is capable of updating the offset value, and the data may be an offset value itself indicating new offset or data indicating a difference between an old offset value and a new offset value. It is to be noted that an algorithm to generate the offset update data in the offset update data generation module 122 may be any type of algorithm capable of generating appropriate offset update data in a case where the mobile information apparatus 10 is manually held by a person. It is to be noted that the magnetic data storage module 121 and the offset update data generation module 122 enable the control section 12 to function as the first generation part.

An offset update data generation module 124 generates second offset update data in a case where the portable information apparatus 10 is held in a vehicle. Specifically, the offset update data generation module 124 judges whether or not the distribution indicated by the samples of the magnetic data stored in the buffer of the magnetic data storage module 123 is sufficiently broad, and the module generates the second offset update data based on the magnetic data stored in the buffer of the magnetic data storage module 123 only in a case where the distribution is sufficiently broad. A method of judging the distribution may be different from that of the offset update data generation module 122, but to facilitate understanding, the method will be described as the same method as that of the offset update data generation module 122. In the offset update data generation module 124, an algorithm to generate the offset update data in the offset update data generation module 124 may be any algorithm capable of generating the appropriate offset update data in a case where the portable information apparatus 10 is held in the vehicle. It is to be noted that the magnetic data storage module 123 and the offset update data generation module 124 enable the control section 12 to function as the second generation part.

As described above, the offset update data generation module 122 is a program to generate the first offset update data for updating the offset value at a time when the portable information apparatus 10 is manually held by a person, and the offset update data generation module 124 is a program to generate the second offset update data for updating the offset value, when the portable information apparatus 10 is held by the vehicle. Therefore, the sampling period of the magnetic data of the magnetic data storage module 121 is set to be shorter than the sampling period of the magnetic data of the magnetic data storage module 123 constituting the second generation part. The number of the magnetic data (the sampling number) to be stored in the buffer of the magnetic data storage module 121 in order to generate one offset update data may be different from or equal to the number of the magnetic data stored in the buffer of the magnetic data storage module 123. The sampling interval corresponds to a product of the sampling period and the sampling number, and the sampling number is set so that the sampling interval of the magnetic data storage module 123 is longer than that of the magnetic data storage module 121.

Figure 2:
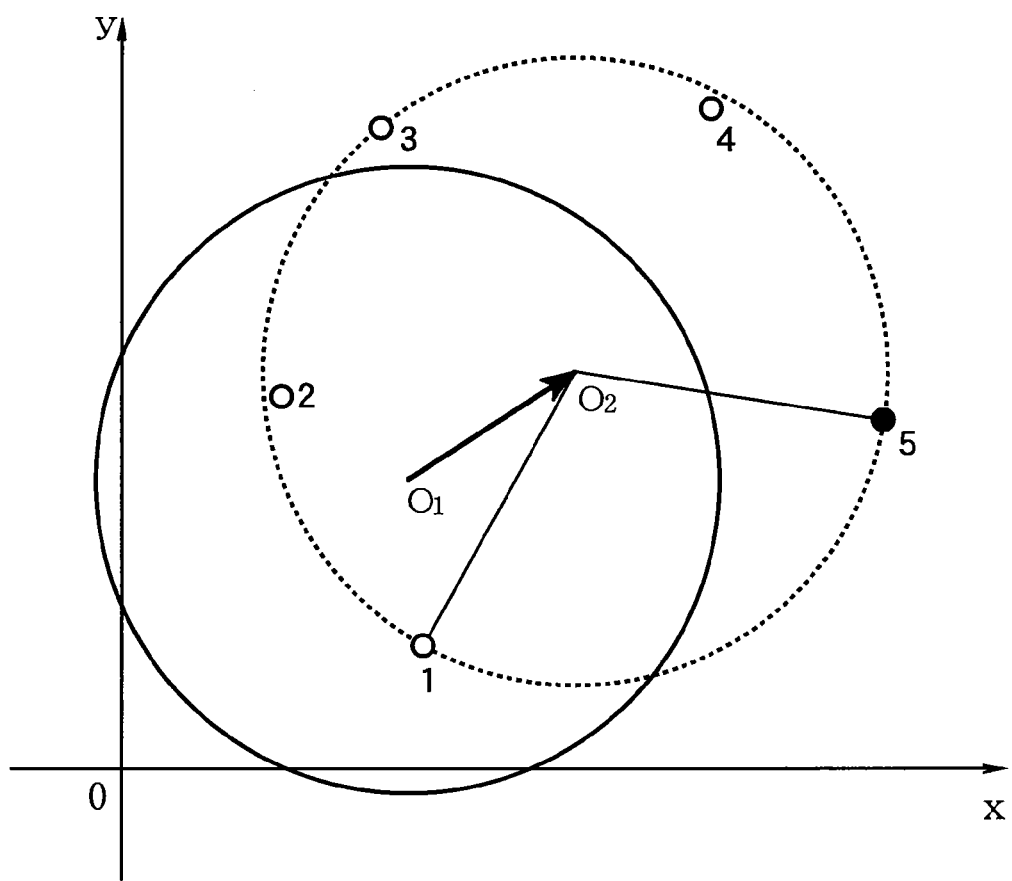
FIG. 2 is an explanatory diagram showing operation of the magnetic data processing apparatus according to the embodiment of the present invention.
Figure 3:
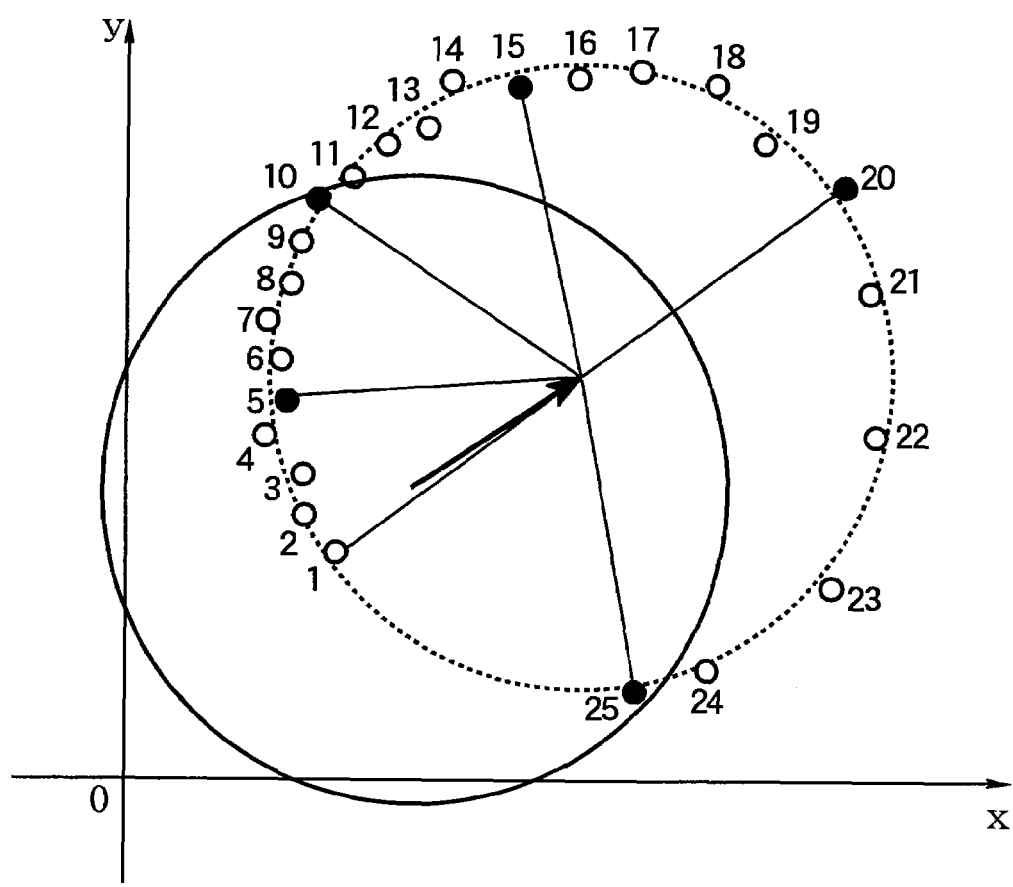
FIG. 3 is another explanatory diagram showing operation of the magnetic data processing apparatus according to the embodiment of the present invention.

FIGS. 2 and 3 are explanatory views illustrating, in a two-dimensional space, a track of the magnetic data stored in the buffer in accordance with a specific sampling rule to record the magnetic data. FIG. 2 shows a state in which the mobile information apparatus 10 is manually held, and FIG. 3 shows a state in which the portable information apparatus 10 is held (mounted on) by the vehicle.

In FIG. 2, a circle of solid line indicates a track of old or previous magnetic data inputted from the geomagnetic sensor. Another circle of dash line indicates a track of samples of new magnetic data which are newly sampled from the geomagnetic sensor. Each sample of the new magnetic data is represented by dots numbered sequentially 1 through 5. The center of the old circular track is indicated by $O_1$ and the center of the new circular track is indicated by $O_2$. The offset is defined by the arrow from $O_1$ to $O_2$.

In FIGS. 2 and 3, white dots show the magnetic data to be stored in the buffer by the magnetic data storage module 121, and black dots show samples of the magnetic data to be stored in the buffer by both the magnetic data storage module 121 and the magnetic data storage module 123. Numerals annexed to the white and black dots indicate a storage order of the magnetic data by the magnetic data storage module 121. In FIGS. 2 and 3, it is indicated that the sampling period of the magnetic data storage module 123 is five times that of the magnetic data storage module 121. The number of the magnetic data stored in the buffer of the magnetic data storage module 121 is equal to the number of the magnetic data in the buffer of the magnetic data storage module 123, and the number is five. Magnetic data up to five from one are deleted before the sixth magnetic data is stored in the buffer.

In a case where the mobile information apparatus 10 is manually held by a person, the magnetic data indicating the distribution which is broad sufficiently for generating the correct offset update data is frequently outputted by the geomagnetic sensor 11 in a short period (e.g., less than one second). In such a case, the sampling rule of the magnetic data storage module 121 is set so that the distribution of the magnetic data stored in the buffer broadens. That is, the sampling period of the magnetic data storage module 121 is set shorter than the sampling period of the magnetic data storage module 123.

On the other hand, in a case where the portable information apparatus 10 is held in the vehicle, for example, in a case where the portable information apparatus 10 is fixed to a base attached to a dashboard of the vehicle, a relatively long duration is required for outputting, from the geomagnetic sensor 11, the magnetic data indicating the distribution which is broad sufficiently for generating the correct offset update data. This is because the vehicle is a transport machine which moves along a road. The sampling rule of the magnetic data storage module 123 is set so that the distribution of the magnetic data stored in the buffer broadens in such a case. That is, the sampling interval of the magnetic data storage module 123 is set longer than the sampling interval of the magnetic data storage module 121. Further, the magnetic data storage module 123 stores the magnetic data in the buffer at a relatively long sampling period as shown in FIG. 3. In a situation where a posture of the mobile information apparatus 10 slowly changes, if the magnetic data storage module 121 continues to store the magnetic data in the buffer at a relatively short sampling period in a long sampling interval and if the number of the magnetic data to be stored in the buffer of the magnetic data storage module 121 is not increased, the correct offset update data cannot be generated from the magnetic data stored in the buffer of the magnetic data storage module 121. Therefore, the sampling period of the magnetic data storage module 123 is set longer than that of the magnetic data storage module 121 so as to efficiently store the magnetic data in the buffer in a situation where the mobile information apparatus 10 slowly changes the posture thereof.

When the offset update data is generated by one of the offset update data generation modules 122, 124, an update module 125 updates offset value 126 based on the generated offset update data. As described above, the offset update data generation modules 122, 124 generate the offset update data only in a case where the distributions of the magnetic data stored in the respective buffers are sufficient for generating the correct offset update data. As described above, the sampling rule indicating that the distribution of the magnetic data stored in the buffer broadens in the situation where the portable information apparatus 10 is manually held is applied to the magnetic data storage module 121, and the sampling rule indicating that the distribution of the magnetic data stored in the buffer broadens in the situation where the mobile information apparatus 10 is held by the vehicle is applied to the magnetic data storage module 123. Therefore, in the situation where the mobile information apparatus 10 is manually held, there is a high possibility that the offset value 126 is updated based on the first offset update data generated by the offset update data generation module 122. On the other hand, in the situation where the mobile information apparatus 10 is held by the vehicle, there is a high possibility that the offset value 126 is updated based on the second offset update data generated by the offset update data generation module 124. As a result, the offset value is updated by the appropriate offset update data in accordance with the state where the portable information apparatus 10 is held without judging whether the portable information apparatus 10 is held manually or by mounting on the vehicle.

As described above, the inventive apparatus 12 is designed for processing magnetic data to update an offset value 126 of the magnetic data. In the apparatus 12, an input part successively inputs magnetic data from a magnetic sensor 11. A first generation part 121, 122 stores samples of the magnetic data in accordance with a first sampling rule, and generates first offset update data based on the stored samples of the magnetic data when a distribution of the stored samples of the magnetic data indicates a first feature. A second generation part 123, 124 stores samples of the magnetic data in accordance with a second sampling rule, and generates second offset update data based on the stored samples of the magnetic data when a distribution of the stored samples of the magnetic data indicates a second feature. An update part 125 updates an offset value of the magnetic data based on the first offset update data when the same is generated, and updates the offset value 126 of the magnetic data based on the second offset update data when the same is generated.

The first generation part 122 generates the first offset update data when the distribution of the stored samples of the magnetic data satisfies a first criteria which is associated with the first feature of the distribution, and the second generation part 124 generates the second offset update data when the distribution of the stored samples of the magnetic data satisfies a second criteria which is associated with the second feature of the distribution.

The first generation part 122 generates the first offset update data when the distribution of the stored samples of the magnetic data satisfies the first criteria and when the magnetic sensor 11 is placed in a first state. The second generation part 124 generates the second offset update data when the distribution of the stored samples of the magnetic data satisfies the second criteria and when the magnetic sensor 11 is placed in a second state different from the first state, The update part 125 updates the offset value of the magnetic data based on either of the first offset update data or the second offset update data without need for detecting whether the magnetic sensor 11 is placed in the first state or the second state.

The magnetic sensor 11 changes its posture fast under the first state as compared to the second state, and the magnetic sensor 11 changes its posture slowly under the second state as compared to the first state. The first generation part 122 adopts the first sampling rule which specifies a fast sampling rate of the magnetic data from the magnetic sensor 11 changing its posture fast, thereby enabling the first generation part 122 to generate the first offset update data, and the second generation part 124 adopts the second sampling rule which specifies a slow sampling rate of the magnetic data from the magnetic sensor 11 changing its posture slowly, thereby enabling the second generation part 124 to generate the second offset update data.

A posture data processing module 127 corrects the magnetic data input from the geomagnetic sensor 11 based on the offset value 126, and generates posture data based on the corrected magnetic data and the acceleration data input from the acceleration sensor 13. The posture data is data indicating the posture of the mobile information apparatus 10. A method of deriving the posture data based on the magnetic data and the acceleration data is well known processing, and hence description thereof is omitted.

An azimuth data processing module 128 is a program for displaying, in the display 14, the azimuth based on the posture data. The azimuth is displayed in the display 14 with graphics such as arrows, characters of east, west, south and north displayed on a map and the like.

[3. Update Processing of Offset Value]

Figure 4:
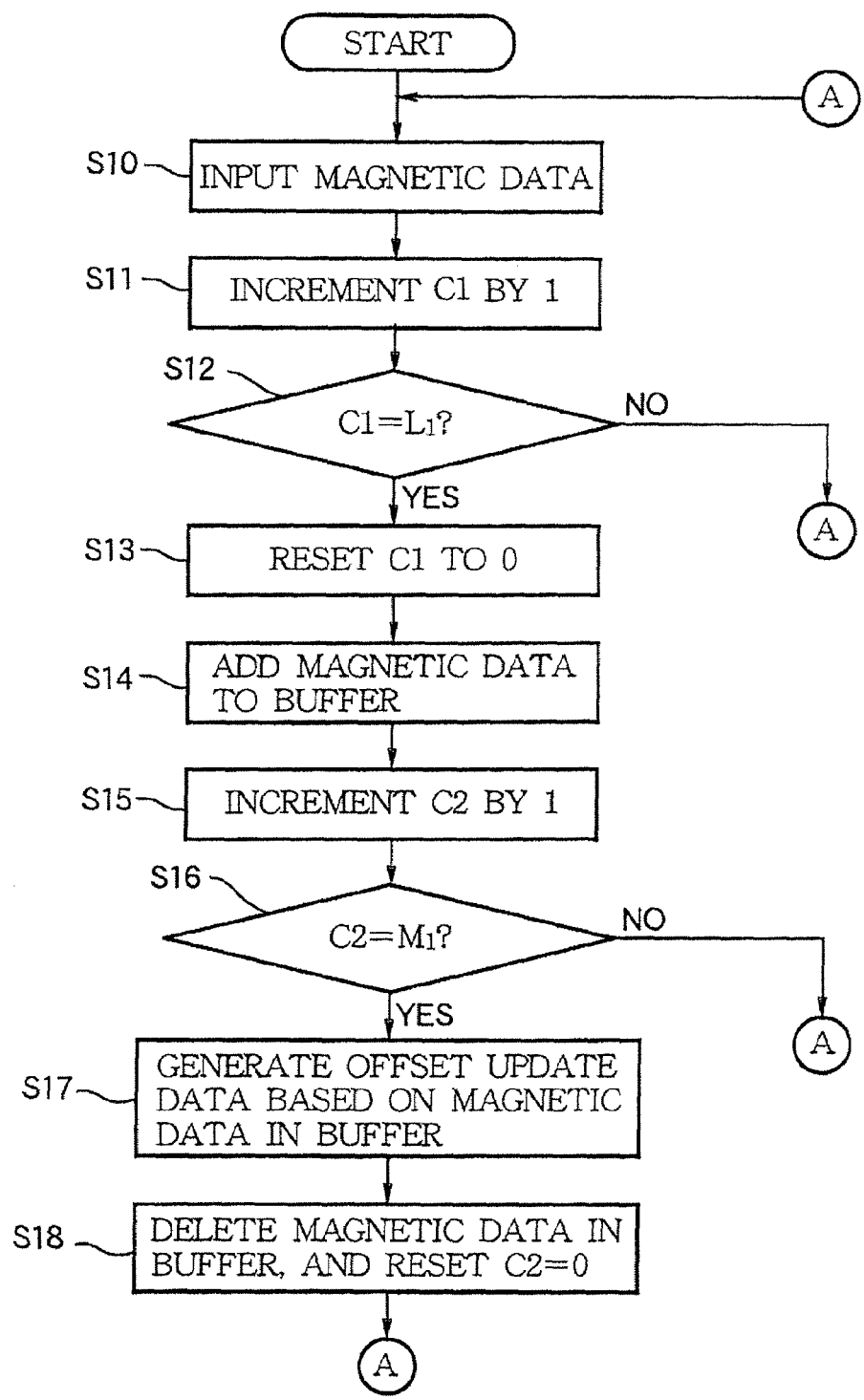
FIG. 4 is a flow chart showing operation of the magnetic data processing apparatus according to the embodiment of the present invention.

FIG. 4 is a flow chart illustrating offset value update processing to be performed by the magnetic data storage module 121, the offset update data generation module 122 and the update module 125.

First, the magnetic data storage module 121 inputs a sample of the magnetic data from the geomagnetic sensor 11 (step S10), gives an increment to a counter C1 (step S11), and judges whether or not the counter C1 is equal to a constant $L_1$ to determine the sampling period (step S12).

The magnetic data storage module 121 advances to processing of the step S10 in a case where the counter C1 is not equal to the constant $L_1$ to determine the sampling period.

When the counter C1 is equal to the constant $L_1$ to determine the sampling period, the magnetic data storage module 121 resets C1 to 0 (step S13), and stores another sample of the magnetic data in the buffer (step S14). As a result, the magnetic data is stored in the buffer at the sampling period determined by the constant $L_1$.

Subsequently, the magnetic data storage module 121 gives an increment to a counter C2 (step S15), and judges whether or not the counter C2 is equal to a constant $M_1$ to determine the sampling number (step S16).

When the counter C2 is not equal to the constant $M_1$ to determine the sampling number, the magnetic data storage module 121 proceeds to the processing of the step S10.

In a case where the counter C2 is equal to the constant $M_1$ to determine the sampling number, the offset update data generation module 122 judges whether or not the distribution of the magnetic data stored in the buffer of the magnetic data storage module 121 is sufficiently broad for generating the correct offset update data, and the module generates the first offset update data in a case where the distribution is sufficiently broad. When the first offset update data is generated, the update module 125 updates the offset value based on the first offset update data.

Regardless of whether or not the first offset update data is generated, the magnetic data storage module 121 deletes the magnetic data stored in the buffer, resets the counter C2 to 0 (step S18), and then proceeds to the processing of the step S10.

The update processing of the offset value to be performed by the magnetic data storage module 121, the offset update data generation module 122 and the update module 125 has been described above. The update processing of the offset value to be performed by the magnetic data storage module 123, the offset update data generation module 124 and the update module 125 is the same except that a value of a constant $L_2$ to determine the sampling period is different from that of the constant $L_1$ of the magnetic data storage module 121. That is, the value of the constant $L_2$ to determine the sampling period of the magnetic data storage module 123 is larger than the value of the constant $L_1$ of the magnetic data storage module 121. In this case, if the value of $M_1$ to determine the sampling number of the magnetic data storage module 121 is equal to a value of $M_2$ to determine the sampling number of the magnetic data storage module 123, the sampling interval of the magnetic data storage module 123 is longer than that of the magnetic data storage module 121. However, in a range where the sampling interval of the magnetic data storage module 123 is longer than that of the magnetic data storage module 121, the value of $M_1$ to determine the sampling number of the magnetic data storage module 121 may be different from that of $M_2$ to determine the sampling number of the magnetic data storage module 123.

[4. Another Embodiment]

A technical range of the present invention is not limited to the above-mentioned embodiment, and needless to say, the present invention can variously be changed within the scope of the present invention.

As described above, the offset update data generation module judges whether or not a distribution indicated by the samples of magnetic data stored in the buffer of the magnetic data storage module is sufficiently broad, for example, judges whether the distribution of the samples of magnetic data is three-dimensional, or two-dimensional or one dimensional. This is because the correct offset update data cannot be generated by the magnetic data having a narrow distribution such as one-dimensional distribution. A criteria value for the judgment may be set to any parameter. For example, the criteria value is set with respect to a ratio of eigenvalues $\lambda 1$, $\lambda 2$, and $\lambda 3$ of the distribution of the magnetic data. The judgment method using these parameters is described below.

Once the specified number of samples of magnetic data (hereafter, data set) is stored in the buffer, the distribution of the data set of statistical population is estimated. The distribution is estimated based on principal values of the distribution. When the magnetic data set is expressed by the following Equation (1), the principal values of the distribution are eigenvalues of a symmetric matrix A defined by Equations (2), (3), and (4) using the sum of vectors starting from a center (average) of the data set of statistical population and ending with the respective magnetic data.

$$q_i = (q_{ix}, q_{iy}, q_{iz}) \ (i=0, 1, 2, \ldots) \quad (1)$$

$$A = X^T X \quad (2)$$

where $$X = \begin{bmatrix} (q_0 - \bar{q})^T \\ (q_1 - \bar{q})^T \\ (q_2 - \bar{q})^T \\ \ldots \\ (q_{N-1} - \bar{q})^T \end{bmatrix} \quad (3)$$

$$\bar{q} = \frac{1}{N} \sum_{i=0}^{N-1} q_i \quad (4)$$

The matrix A may also be rewritten as Equation (5).

$$A = \sum_{i=0}^{N-1} (q_i - \bar{q})(q_i - \bar{q})^T \quad (5)$$

Let $\lambda_1$, $\lambda_2$, and $\lambda_3$ be the eigenvalues of the matrix A in increasing order. Let $u_1$, $u_2$, and $u_3$ be mutually orthogonal eigenvectors that correspond to $\lambda_1$, $\lambda_2$, and $\lambda_3$ and have been normalized to size 1. The ranges of $\lambda_1$, $\lambda_2$, and $\lambda_3$ handled in this specification are $\lambda_1 > 0$, $\lambda_2 > 0$, and $\lambda_3 \geq 0$. When two or more eigenvalues of the matrix A are zero, i.e., when the rank of the matrix A is one or less, there is no need to consider it since the number of elements of the data set of statistical population is one or the distribution is a perfectly straight line. Each of the eigenvalues must be zero or a positive real number since the matrix A is a positive semi-definite matrix from its definition.

The distribution of the data set of statistical population is estimated based on the ratio $\lambda_3/\lambda_1$ of the minimum eigenvalue to the maximum eigenvalue and the ratio $\lambda_2/\lambda_1$ of an intermediate eigenvalue to the maximum eigenvalue.

It is determined whether or not the distribution of the data set of statistical population is sufficiently three-dimensional. Specifically, the determination is affirmative when the following condition (6) is satisfied and negative when it is not satisfied.

$$\lambda_3/\lambda_1 > t_1 \text{ and } \lambda_2/\lambda_1 > t_2 \quad (6)$$

Here, "$t_1$" and "$t_2$" are predetermined constant values, namely criteria value. How to set the criteria values $t_1$ and $t_2$ is a design option and they can be set optionally based on how to determine derivation characteristics of the offset. When the condition (6) is satisfied, the data set of statistical population is distributed isotropically from the center of the data set of statistical population. The isotropic distribution of the data set of statistical population about the center indicates that the data set of statistical population is distributed evenly near a specific spherical surface.

It is determined whether or not the distribution of the data set of statistical population is sufficiently two-dimensional. Specifically, the determination is affirmative when the following condition (7) is satisfied and negative when it is not satisfied.

$$\lambda_3/\lambda_1 \leq t_1 \text{ and } \lambda_2/\lambda_1 > t_2 \quad (7)$$

When the condition (7) is satisfied, the data set of statistical population is distributed isotropically from the center of the data set of statistical population in a range restricted near a specific plane. The isotropic distribution of the data set of statistical population about the center in a range restricted near a specific plane indicates that the data set of statistical population is unevenly distributed near the circumference of a sectional circle of a specific spherical surface.

When the determination above is negative, the distribution of the data set of statistical population is substantially one-dimensional (i.e., linear). The substantially linear distribution of the data set of statistical population indicates that the data set of statistical population is unevenly distributed on a short arc of a sectional circle of a specific spherical surface or on both ends of a diameter of the sectional circle. If the distribution of the data set is one-dimensional, the data set is not suitable for calculating the offset. Such a data set may be erased from the buffer, and a next data set may be collected from the magnetic sensor.

The invention claimed is:

1. An apparatus for processing magnetic data to update an offset value of the magnetic data, the apparatus comprising:
   an input part that successively inputs magnetic data from a magnetic sensor;
   a first generation part that stores samples of the magnetic data in accordance with a first sampling rule, and generates first offset update data based on the stored samples of the magnetic data when a distribution of the stored samples of the magnetic data indicates a first feature;
   a second generation part that stores samples of the magnetic data in accordance with a second sampling rule, and generates second offset update data based on the stored samples of the magnetic data when a distribution of the stored samples of the magnetic data indicates a second feature; and
   an update part that updates an offset value of the magnetic data based on the first offset update data when the first offset update data is generated, and that updates the offset value of the magnetic data based on the second offset update data when the second offset update data is generated.

2. The apparatus according to claim 1,
   wherein the first generation part adopts a first sampling rule that represents a sampling interval during which a number of samples are stored for generating the first offset update data, and that represents a sampling period at which each sample is stored, and
   wherein the second generation part adopts a second sampling rule that represents a sampling interval longer than the sampling interval of the first sampling rule, and that represents a sampling period longer than the sampling period of the first sampling rule.

3. The apparatus according to claim 1, further comprising the magnetic sensor.

4. The apparatus according to claim 1, further comprising a correction part that corrects the magnetic data outputted by the magnetic sensor based on the offset value.

5. The apparatus according to claim 4,
wherein the magnetic sensor senses a geomagnetism to output the magnetic data which contains an offset due to an external magnetic field, and
wherein the correction part corrects the magnetic data outputted by the magnetic sensor based on the offset value to thereby remove the offset.

6. The apparatus according to claim 1,
wherein the first generation part generates the first offset update data when the distribution of the stored samples of the magnetic data satisfies a first criteria which is associated with the first feature of the distribution, and
wherein the second generation part generates the second offset update data when the distribution of the stored samples of the magnetic data satisfies a second criteria which is associated with the second feature of the distribution.

7. The apparatus according to claim 6,
wherein the first generation part generates the first offset update data when the distribution of the stored samples of the magnetic data satisfies the first criteria and when the magnetic sensor is placed in a first state,
wherein the second generation part generates the second offset update data when the distribution of the stored samples of the magnetic data satisfies the second criteria and when the magnetic sensor is placed in a second state different from the first state, and
wherein the update part updates the offset value of the magnetic data based on either of the first offset update data or the second offset update data without need for detecting whether the magnetic sensor is placed in the first state or the second state.

8. The apparatus according to claim 7,
wherein the magnetic sensor changes its posture fast under the first state as compared to the second state, and the magnetic sensor changes its posture slowly under the second state as compared to the first state, and
wherein the first generation part adopts the first sampling rule which specifies a fast sampling rate of the magnetic data from the magnetic sensor changing its posture fast, thereby enabling the first generation part to generate the first offset update data, and the second generation part adopts the second sampling rule which specifies a slow sampling rate of the magnetic data from the magnetic sensor changing its posture slowly, thereby enabling the second generation part to generate the second offset update data.

9. A method of processing magnetic data to update an offset value of the magnetic data, the method comprising:
successively inputting magnetic data from a magnetic sensor;
storing samples of the magnetic data in accordance with a first sampling rule, and generating first offset update data based on the stored samples of the magnetic data when a distribution of the stored samples of the magnetic data indicates a first feature;
storing samples of the magnetic data in accordance with a second sampling rule, and generating second offset update data based on the stored samples of the magnetic data when a distribution of the stored samples of the magnetic data indicates a second feature; and
updating an offset value of the magnetic data based on the first offset update data when the first offset update data is generated, and updating the offset value of the magnetic data based on the second offset update data when the second offset update data is generated.

10. A machine readable medium for use in a computer, the medium containing program instructions executable by the computer to perform processing of magnetic data to update an offset value thereof, wherein the processing comprises:
successively inputting magnetic data from a magnetic sensor;
storing samples of the magnetic data in accordance with a first sampling rule, and generating first offset update data based on the stored samples of the magnetic data when a distribution of the stored samples of the magnetic data indicates a first feature;
storing samples of the magnetic data in accordance with a second sampling rule, and generating second offset update data based on the stored samples of the magnetic data when a distribution of the stored samples of the magnetic data indicates a second feature; and
updating an offset value of the magnetic data based on the first offset update data when the first offset update data is generated, and updating the offset value of the magnetic data based on the second offset update data when the second offset update data is generated.

* * * * *